United States Patent Office 3,005,851
Patented Oct. 24, 1961

3,005,851
CHEMICAL COMPOUNDS CONTAINING RARE GASES
Samuel Aaron Miller, London, and John George Waller, Sutton, England, assignors to The British Oxygen Company Limited, a company of Great Britain
No Drawing. Filed Dec. 7, 1959, Ser. No. 857,529
Claims priority, application Great Britain Dec. 10, 1958
5 Claims. (Cl. 260—593)

This invention relates to new chemical compounds of the rare gases, argon, krypton and xenon.

According to one aspect of the present invention, there are provided new chemical compounds of the formula:

$$(CH_3)_2CO \cdot 2R \cdot 17H_2O$$

where R is argon, krypton or xenon.

According to another aspect of the invention, a method of preparing compounds of the formula:

$$(CH_3)_2CO \cdot 2R \cdot 17H_2O$$

where R is argon, krypton or xenon, comprises bubbling the rare gas under pressure through a mixture of acetone and water which is cooled to a temperature just above its freezing point.

In order to prepare the compounds in a reasonable time at a high yield, it is necessary to employ pressures of 100 atm. or over for the argon compound, 30 atm. or over for the krypton compound and 5 atm. or over for the xenon compound respectively. The argon, krypton and xenon compounds can, however, be prepared in lower yields and over a longer period at pressures of 50 atm. and over, 15 atm. and over, and 1 atm. and over respectively. These pressures are all expressed in atmospheres absolute.

X-ray examination has shown that the new compounds are of the type known as "inclusion" compounds, in which the crystal lattice of one component (water) has cavities which can trap molecules of other components which are of the correct molecular free diameter to be retained in the cavity. They are complex cubic compounds consisting of one acetone molecule, two rare gas molecules and seventeen water molecules. For argon, the unit cell dimensions are 17.3–17.35 A. These dimensions are in agreement with theoretical expectations for a compound of this type.

While the possible uses of the new compounds have not as yet been fully investigated, it is believed that they may be useful in the separation, purification and transport of the rare gases. In particular, since the decomposition pressure of the xenon compound is low, it is possible that the compound can be used to transport xenon at pressures near atmospheric at temperatures around $-10°$ C. or in light-weight cylinders at ambient temperature.

The invention is illustrated by the following example:

Example

Some argon/acetone hydrate was prepared by placing 80 ml. of water and 20 ml. of acetone in a cylindrical pressure vessel and pressurizing to 120 atm. with argon. The gas inlet to the vessel was through a tube which passed under the surface of the liquid to a level near the bottom of the vessel. The vessel and its contents were cooled to $-15°$ C. and the liquid was agitated by allowing some gas to escape from the vessel while maintaining the pressure in the vessel. After 3 hours the preparation was stopped and the pressure in the vessel was released. On opening the vessel a solid block of hydrate was removed. A sample of the white solid was transferred to a test tube and a stopper, carrying a tube connected to a gas burette, was inserted. The hydrate was allowed to decompose, the volume of the gas evolved was measured and the weight of residual liquid determined. It was found that 123 ml. of gas were evolved for each gram of residual liquid. Thus, in the hydrate, 1 g. of 20% v./v. aqueous acetone, equivalent to 0.97 g. of aqueous acetone, was associated with 123 ml. of gas. This corresponds to the formula $$0.98(CH_3)_2CO \cdot 2Ar \cdot 16.5H_2O$$

This composition was obtained from the centre core of the block of hydrate. On the sides of the block, lower gas contents were obtained.

The proportion of acetone to water chosen in this example was approximately that required by the formula $(CH_3)_2CO \cdot 2Ar \cdot 17H_2O$. If higher acetone concentrations are used, a product containing acetone and water in the molecular ratio 1:17 is still obtained.

We claim:
1. Chemical compounds of the formula:

$$(CH_3)_2CO \cdot 2R \cdot 17H_2O$$

where R is a rare gas selected from the group consisting of argon, krypton and xenon.

2. The method of preparing compounds of the formula:

$$(CH_3)_2CO \cdot 2R \cdot 17H_2O$$

where R is a rare gas selected from the group consisting of argon, krypton and xenon, comprising bubbling the rare gas under a pressure of at least 50 atmospheres absolute when the rare gas is argon, a pressure of at least 15 atmospheres absolute when the rare gas is krypton, and a pressure of at least 1 atmosphere absolute when the rare gas is xenon, through a mixture of acetone and water cooled to a temperature just above its freezing point.

3. The method of preparing a compound having the formula:

$$(CH_3)_2CO \cdot 2Ar \cdot 17H_2O$$

comprising bubbling argon at a pressure of at least 100 atmospheres absolute through a mixture of acetone and water cooled to just above its freezing point.

4. The method of preparing a compound having the formula:

$$(CH_3)_2CO \cdot 2Kr \cdot 17H_2O$$

comprising bubbling krypton at a pressure of at least 30 atmospheres absolute through a mixture of acetone and water cooled to just above its freezing point.

5. The method of preparing a compound having the formula:

$$(CH_3)_2CO \cdot 2Xe \cdot 17H_2O$$

comprising bubbling xenon at a pressure of at least 5 atmospheres absolute through a mixture of acetone and water cooled to just above its freezing point.

References Cited in the file of this patent

FOREIGN PATENTS 678,313     Great Britain _____ Sept. 3, 1952

OTHER REFERENCES

Forcrand: Compt. rend. 176, pages 355–8 (1923).
De Forcrand: Compt. rend. 181, pages 15–17 (1925).